Sept 17, 1957           E. E. FEY           2,806,307

VEHICLE OPERATED AUTOMATIC FLUSH TYPE GATE

Filed April 26, 1954           2 Sheets-Sheet 1

INVENTOR.
Ernest E. Fey
BY
John J. McLaughlin
Attorney

Sept 17, 1957 E. E. FEY 2,806,307
VEHICLE OPERATED AUTOMATIC FLUSH TYPE GATE
Filed April 26, 1954 2 Sheets-Sheet 2

INVENTOR.
Ernest E. Fey
BY
John J. McLaughlin
Attorney

# United States Patent Office 2,806,307
Patented Sept. 17, 1957

2,806,307

VEHICLE OPERATED AUTOMATIC FLUSH TYPE GATE

Ernest E. Fey, Tucson, Ariz.

Application April 26, 1954, Serial No. 425,697

6 Claims. (Cl. 39—6)

My invention relates to self-operating gate systems, and more in particular to a mechanical gate construction which is automatically operated by an approaching automobile to open the same and is retained in full open position until the automobile clears the mechanism entirely.

In many parts of the country considerable advantage in time saving is possible by the use of automatically operating gates, particularly gates on private estates, ranches and the like of considerable size where fencing is necessary. Large ranches commonly use what is known as a cattle guard at fence openings where vehicular traffic passes, but cattle guards are limited in their utility. Electrically operated gates have been installed and used successfully, but from an original and maintenance cost standpoint they are prohibitive for most people. Various types of mechanical gates have been suggested in the past, and many such gates are found in the patented art. In general, however, they are unsuited for use where automobile traffic is involved and have other undesirable features which have prevented their being placed in common use.

The principal object of my invention is the provision of an improved self-operating gate system.

Another object is the provision of an improved automatic mechanical gate.

Still another object is the provision of a mechanical gate so constructed and arranged that the gate will be fully opened when a vehicle approaches the same and will be retained in fully opened position until the vehicle entirely clears the mechanism.

A further object is the provision of a self-operating mechanical gate which is inexpensive to produce, install, and maintain.

Other specific objects and features of my invention will be apparent from the following detailed description taken with the accompanying drawings, wherein.

Figure 1:
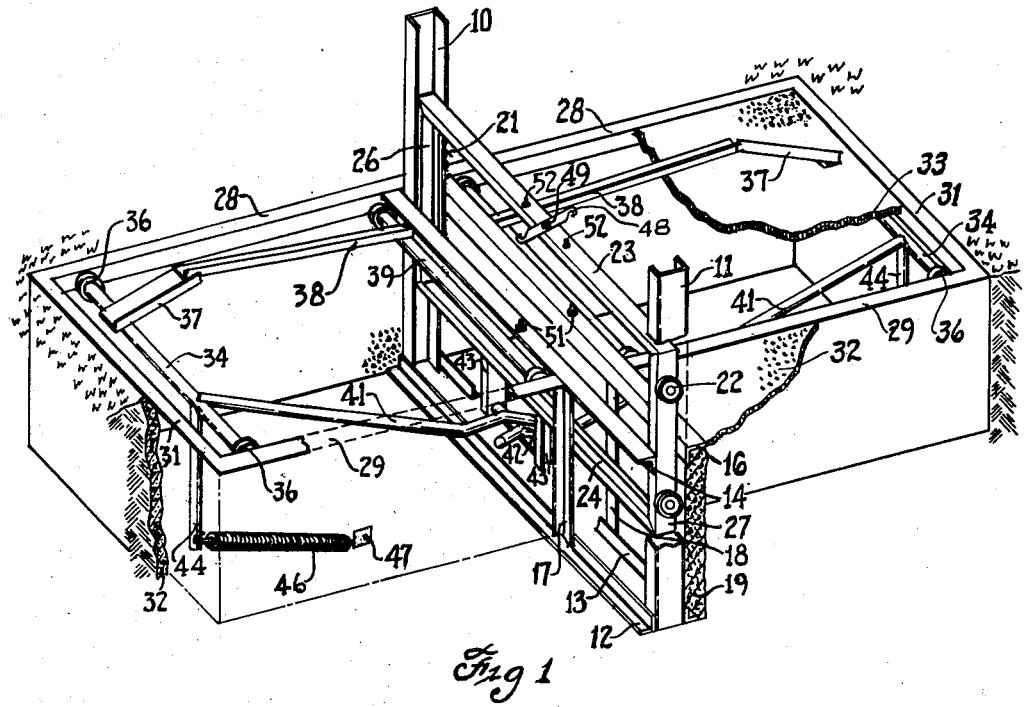
Fig. 1 is an isometric view partly broken away showing one embodiment of the gate of my invention installed and ready for operation.
Figure 2:
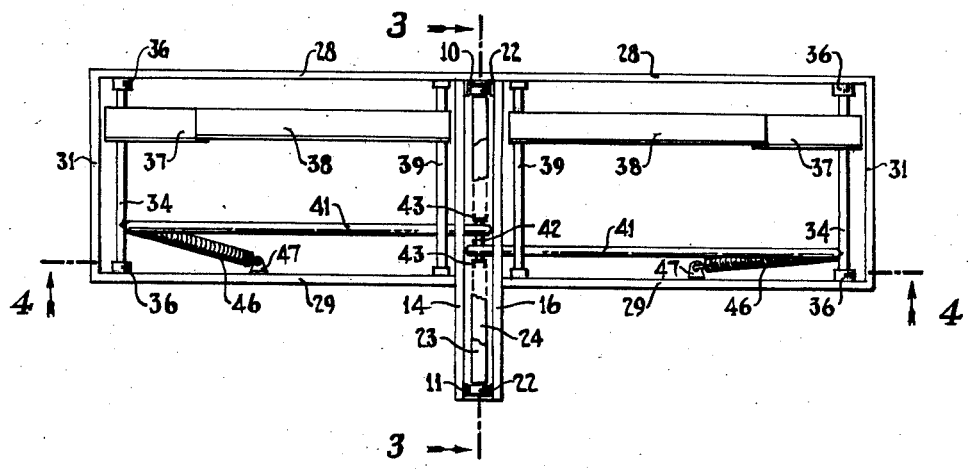
Fig. 2 is a plan view thereof entirely removed from the surrounding road and earth structure with which it may be associated.
Figure 3:
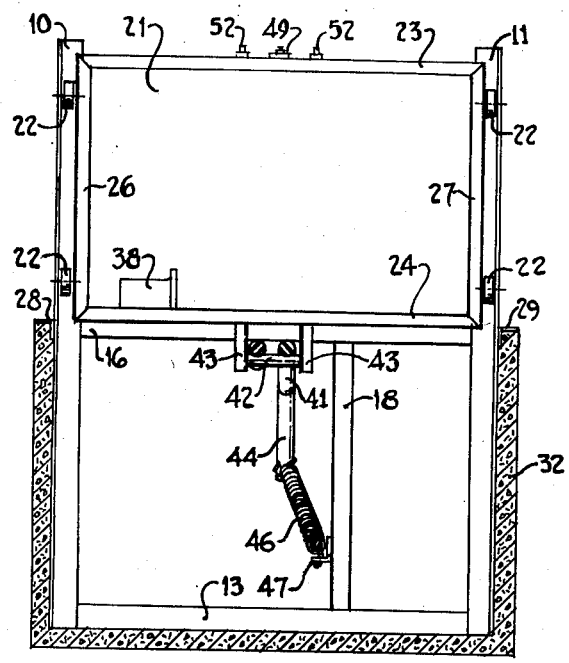
Fig. 3 is an enlarged sectional view taken on the line 3—3 of Fig. 2.
Figure 4:
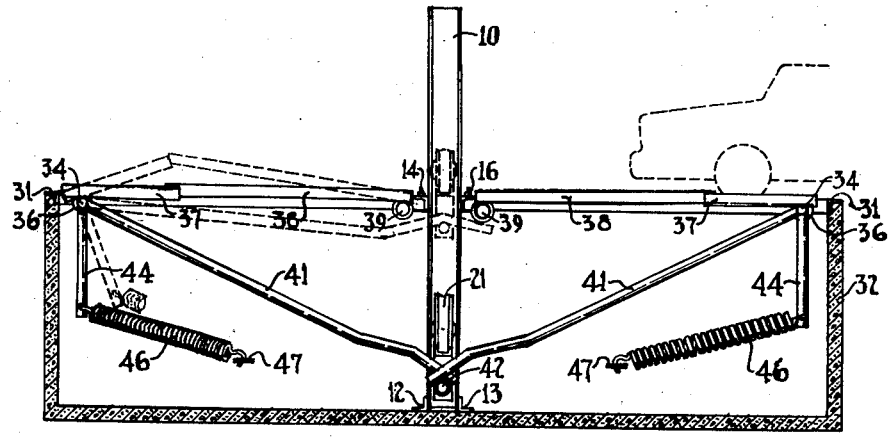
Fig. 4 is a sectional view taken along the line 4—4 of Fig. 2.

The form of my invention shown in the drawings comprises a pair of channel shaped upright guide members 10 and 11, a pair of transverse angles 12 and 13 tying the channels 10 and 11 together at their bottom end, a pair of intermediate angle members 14 and 16 at the road level, and a pair of upright angles 17 and 18 tying together the previously referred to angles 12, 13, 14 and 16. The channels 10 and 11 with their associated angles together form, when assembled by welding or the like, a single-piece structure which is adapted to be partly buried in the ground and surrounded with concrete structure as indicated at 19 in Fig. 1. A narrow transverse pit extending to the bottom of the channels 10 and 11 is formed thereby to provide an opening for receipt of a gate 21 which is vertically reciprocable in the guides 10 and 11. If desired, rollers 22 may be provided on the gate to reduce friction between the gate and inside surfaces of the guides. Such rollers may be provided in any suitable number and arranged in any suitable manner to serve the intended purpose.

While the gate in the drawings is indicated as comprising a single-piece, rectangular frame structure comprising top and bottom sills 23 and 24 and side members 26 and 27, all comprising channel shaped members, any usual and conventional gate structure common to the arts may be used.

Secured to the frame structure of which the guides 10 and 11 form a part are frame members 28 and 29. These frame members are suitably formed of common steel angles and are connected at their outer ends by cross pieces 31. The frame members 28, 29 and 31 define the outline of pits extending longitudinally of the road, also formed suitably such as by means of a concrete structure 32. The pits so defined and formed house the main part of the actuating mechanism for the gate. The said pits are suitably covered at their tops, as by use of reenforced concrete slabs 33 or any other suitable way.

Spaced from the gate proper are rock shafts 34 journaled in suitable bearings 36 carried by the frame members 28 and 29. Ramp 37 is fixed on the rock shaft 34 and slants upwardly in a direction toward the gate. A second ramp 38 is pivoted on a shaft 39 near the gate and has its outer end lying slightly over the top of the ramp 37. While the ramps 37 and 38 are intended to operate together and may be suitably tied together to assure such operation, I have found that the suspended weight of the ramp 38 is sufficient to cause it to be held by gravity in contact with the ramp 37 and follow said ramp 37 downwardly when it is depressed by a weight of any kind in engagement with it.

To operate the gate, an actuating bar 41 has one end secured to the rock shaft 34 and its opposite end projecting into a slot formed at the bottom of the gate by a transverse bar 42 held by two projections 43 from the bottom frame member 24 of the gate. A downwardly projecting arm 44 from the assembly comprising the rock shaft 34 has a tension gate return spring 46 secured to its lower end, the opposite end of the spring being secured to a bracket 47 suitably anchored in the concrete forming the longitudinal pit. The bracket 47 obviously may be secured in many different positions and in many different ways so long as a tensioning spring action on the arm 44 is made possible.

In order to secure the gate permanently in open position if required, I provide a latching bar 48 at the center of the gate frame member 23 pivoted in its center on a pin 49 and having a pair of hook-like projections adapted to engage around fastening members 51 on the frame members 14 and 16. Keepers 52 for the latching bar may be provided on the top gate frame member 23.

The embodiment of the invention shown in the drawings has been selected to facilitate showing of the main functional members and the manner of operation, but it should be understood that in actual fabrication many simplifications are possible.

I have described my invention in detail and show a specific embodiment of it which clearly indicates its features of construction and operation. Those skilled in the art will understand, however, that I do not limit myself to the exact structure shown and described, the scope of the invention being defined in the appended claims.

I claim:

1. In an automatic mechanical gate, means forming a pit extending across a road, a pair of upright guides extending into and above said pit, a gate vertically reciprocable in said guides to a position to obstruct said road, or a position in the pit to open said road, means forming a slot at a bottom center portion of the gate, a pair of rock shafts supportable transversely of and below the road and spaced from said gate, inclined ramp means secured to each such rock shaft in alignment with each other and at a place on the road where an automobile's wheels will normally run, an actuating bar secured to each such rock shaft below the road and having ends extending into said actuating slot on the gate so that depressing either or both ramp means will lower the gate and move both actuating bars, and return biasing means associated with each such actuating bar, the said ramp means, rock shafts, actuating bars and return biasing means all operating in unison to form a balanced structure and positively hold the gate in lower position from the time a first entering front wheel engages a ramp means until a rear wheel clears the said ramp means.

2. An automatic mechanical gate as defined in claim 1 wherein each such ramp means comprises a ramp member pivoted to its rock shaft and slanting upwardly toward the gate, and a ramp member pivoted adjacent the gate and slanting upwardly away from the gate and having its end overlying the first mentioned ramp member.

3. An automatic mechanical gate as defined in claim 1 wherein said return biasing means comprises an arm integral with and extending downwardly from each said rock shaft, and a tension spring having one end fixed and one end secured to said arm.

4. In an automatic mechanical gate, means forming a pit extending across a road, a pair of upright guides extending into said pit, a gate vertically reciprocable in said guides, a pair of rock shafts supportable transversely of the road but spaced from said pit, inclined ramp means secured to each such rock shaft in alignment with each other and at a place in the road where an automobile's wheels will normally run, an actuating bar secured to each such rock shaft and having ends extending into contact with a lower portion of said gate to form a virtual pivot connection between said arms and said gate, so that depressing either or both ramp means will lower the gate and move both actuating bars, and return biasing means associated with each such actuating bar, the said ramp means, rock shafts, actuating bars and return biasing means all operating in unison to form a balanced structure and positively hold the gate in lower position from the time a first entering front wheel engages a ramp means until a rear wheel clears the said ramp means.

5. In an automatic mechanical gate, means forming a pit across a road, a pair of upright guides extending into said pit, a gate vertically reciprocable in said guides, means forming a slot as a bottom center portion of said gate, a pair of rock shafts supportable transversely of the road but spaced from said pit, a ramp secured to each rock shaft slanting upwardly toward the gate, a second ramp pivoted near the gate and inclined upwardly and lying by gravity contact with each such first mentioned ramp, said ramps being aligned with each other and with the position an automobile's wheels will occupy if passing through the gate, an actuating bar secured to each such rock shaft and having an extending end engaging in said bottom slot in the gate, a downwardly extending arm secured to each rock shaft, and tension spring means secured to the free end of each such arm to bias the said shafts in a direction to hold the gate in elevated position.

6. In an automatic gate, a pair of vertical guides, a gate vertically reciprocable in said guides to upper closing position and open position below a road's surface, resilient means normally holding the gate in an upper position, a pair of ramps, each pivoted at a position spaced from the gate and aligned with the normal path of an automobile passing through the gate, each such ramp slanting upwardly toward the gate, a second pair of ramps pivoted adjacent the gate and slanting upwardly overlying and in gravity contact with the first mentioned ramps so that downward pressure on any ramp member will cause the entire ramp system to be depressed, and a mechanical connection between said first mentioned ramps and said gate to cause depression of the ramp system to lower the gate.

References Cited in the file of this patent
UNITED STATES PATENTS

| | | |
|---|---|---|
| 169,449 | Knepper | Nov. 2, 1875 |
| 1,476,963 | Gibbons | Dec. 11, 1923 |
| 1,530,056 | Pace | Mar. 17, 1925 |
| 1,884,447 | White | Oct. 25, 1932 |